Patented Sept. 25, 1923.

1,468,867

UNITED STATES PATENT OFFICE.

JAMES B. PIERCE, JR., OF CHARLESTON, WEST VIRGINIA.

BLANC FIXE.

No Drawing.   Application filed May 18, 1922. Serial No. 561,867.

*To all whom it may concern:*

Be it known that I, JAMES B. PIERCE, Jr., a citizen of the United States, and a resident of Charleston, in the county of Kanawha and State of West Virginia, have invented new and useful Improvements in Blanc Fixe, of which the following is a specification.

This invention relates to barium sulphate of the type commonly termed blanc fixe and has for its principal objects the production of a blanc fixe which is extremely fine and free from foreign substances, especially alkaline, acid and neutral salts and iron, which is capable of adsorbing other substances with but little, if any, increase in the size of the ultimate particles as viewed under the microscope and particularly when said adsorbed substances are of a colloidal or highly dispersed nature. Other objects of the invention are the production of barium sulphate which possesses to an unusual degree the properties of solid solution as well as the formation of chemical complexes.

In the production of my improved blanc fixe product I preferably proceed as follows:—

A solution of barium sulphide is caused to interact with a solution of sodium sulphate, (the latter being preferably prepared by the interaction of combining weights of sodium sulphide and niter cake) the barium sulphide being maintained in excess, throughout the precipitation, of that theoretically required to satisfy the sodium sulphate. The temperature of the solution is maintained at such points that the temperature of the mixture in the precipitating vessel will range between 50° C., and 100° C., preferably from 60° C. to 75° C., throughout the precipitation. Between these temperatures the precipitated barium sulphate is finer than if the solution were colder, with the consequence that the top liquor and subsequent wash solutions can be decanted off in a more satisfactory manner. It is important, moreover, that the strength of the aforesaid barium sulphide solution employed should bebetween the ranges of 12% and 20% of barium suphide content and also that the strength of the aforesaid sodium sulphate solution employed should be between the ranges of 20% and 30% sodium sulphate content.

Variations from the aforesaid limits, either of the strength or the temperature of the solution employed, will result in the production of a coarse precipitate of barium sulphate which settles much slower and is accordingly less easily washed or decanted.

The precipitate obtained from the foregoing reaction is washed with water free from iron or added foreign salts, preferably water which has been agitated with a small amount of barium carbonate sufficient to remove any iron and like impurities therein and then filtered, as if ordinary surface or well water is used the precipitated barium sulphate will be distinctly colored, due to the formation of iron sulphide by interaction between the salts in the water and the sodium sulphides of the top liquor. In order to maintain at the maximum the advantages resulting from the foregoing treatment, it is also highly desirable that the wash water should be maintained at a temperature of not less than 50° C., preferably from 60° C. to 75° C., during the washing operation.

A careful observance of the foregoing conditions during the precipitation and washing of the barium sulphate will enable one to produce a practically neutral (there being but the very slighest trace of alkalinity) precipitated barium sulphate, or blanc fixe, of a pure white color whose ultimate particles under the microscope appear spherical in shape and amorphous rather than crystalline and measure but from two to three micromillimeters in diameter.

The barium sulphate product obtained by the foregoing procedure is not only of an extreme degree of fineness and remarkably free from foreign substances, especially alkaline, acid and neutral salts, and also iron, but it possesses in a remarkable degree the property of adsorbing other substances to a much greater degree than blanc fixe such as has been heretofore produced and furthermore the ultimate particles of such barium sulphate plus the dispersed substances, especially when such adsorbed substance is of a colloidal or highly dispersed nature, approximates but little if any increase in its microscopic dimensions over the original ultimate particles of barium sulphate. For example if such product be mixed with a solution of a salt of titanium, say titanium sulphate in sulphuric acid or a solution of titanic acid in sulphuric acid, and the titanium be hydrolized or precipitated as titanium hydrate or titanic acid, the said titanium hydrate or titanic acid will be adsorbed by the barium sulphate or may pass into the barium sulphate or both.

The product resulting from the above mentioned procedure possesses neither the properties of titanium hydrate or titanic acid nor barium sulphate, since—

(a) It can be filtered, thus differentiating it from titanium hydrate or titanic acid; and (b) There is a slight increase in the size of the microscopic dimension of the ultimate particles, averaging about one micromillimeter; i. e., the ultimate particle of barium sulphate as prepared by the foregoing process measures two to three micromillimeters in diameter and after treatment with titanium the measurement will be approximately three to four micromillimeters; and (c) Under microscopic examination, no separate identity of ultimate particles can be differentiated as between the barium sulphate and titanium hydrate or titanic acid, or oxid of titanium.

My improved barium sulphate product, prepared in accordance with the foregoing procedure, will inevitably contain a fraction of a percent of sodium sulphate, usually from 0.1% to 0.5% in actual combination therewith, since the latter cannot be removed either by washing with hot water or by mechanical means of separation. Apparently this is due to the fact that the barium sulphate has, thru adsorption, or as a chemical complex, or by all of these three phenomena, entered into combination with the sodium sulphate. Furthermore, my barium sulphate when subjected to calcination at say 900° C., will shrink gradually until its bulk is but 50% to 75% of its bulk before calcination. While the specific gravity of the mass remains substantially unaffected by said calcination, its specific volume is proportionately greater, i. e., its weight per given bulk is heavier.

Such unusual shrinkage on calcination as compared with ordinary blanc fixe can best be explained by the fact that the product being highly amorphous and porous becomes crystalline and consequently occupies much less space after calcination.

My improved barium sulphate product in addition to the foregoing application, is peculiarly useful in the vulcanization of rubber in which operation it can be substituted not only for all of the coarser blanc fixe which is at present employed, but also in part for the zinc oxide, it having been ascertained that from 25% to 50% of the zinc oxide, which would otherwise be required in conjunction with ordinary blanc fixe, can be dispensed with when employing my improved product, notwithstanding the fact that when using coarser blanc fixe it is not possible to substitute the same for part of such zinc oxide which is now required for such purposes.

While my preferred barium sulphate product has ultimate particles whose diameters will average less than three micro-millimeters and will form complexes, with titanic acid for example, in which the average diameter of the ultimate particles thereof does not exceed four micro-millimeters, I do not want to be understood as restricting myself to such limits, as even barium sulphate, whose particles will increase in size up to 100% over their original bulk when forming such a complex, may if it possesses the other desirable properties of my improved product as hereindescribed be suitable under many conditions as a substitute for my preferred product, but ordinarily such increase in size of the particles vary from 33⅓% to 50% or 75% over the original bulk of said particles.

I am aware that in Patent No. 973,374 it is proposed to fuse barium sulphate and sodium sulphate and reference is made to the fact that such procedure produces a pigment of superior quality at small cost. It is specifically stated in said patent, however, that the sodium sulphate being soluble can be "dissolved away from the barium sulphate" which will remain behind in a state of extreme subdivision. It is not considered that the aforesaid process is at all analogous to the process herein claimed wherein a barium sulphate containing sodium sulphate in combination is produced which has remarkable properties of adsorption, solid solution or forming chemical complexes. Accordingly, any process such as described in Patent No. 973,374, or the product of any such process, is specifically disclaimed as not being within the contemplated scope of the claims herein claimed.

Having thus described my invention, what I claim and desire to secure by U. S. Letters Patent is:

1. The hereindescribed barium sulphate product having ultimate particles of an average diameter of less than three micro-millimeters and which particles are capable of adsorbing highly dispersed colloidal particles to form a complex whose ultimate particles have an average diameter of less than 100% more than that of the barium sulphate ultimate particles.

2. The hereindescribed barium sulphate product having ultimate particles of an average diameter of less than three micro-millimeters and which particles are capable of adsorbing highly dispersed colloidal particles to form a complex whose ultimate particles have an average diameter of less than 75% more than that of the barium sulphate ultimate particles.

3. A barium sulphate characterized by having amorphous, highly porous particles the average maximum dimension of which is less than three micro-millimeters.

4. A barium sulphate characterized by having amorphous, highly porous particles the average maximum dimension of which is less than three micro-millimeters, and which is capable of forming a complex with titanium hydrate wherein the titanium compound is adsorbed by the barium sulphate particles to such an extent that the average maximum dimensions of the ultimate complex particles are less than five micro-millimeters.

5. A barium sulphate characterized by having amorphous, highly porous particles the average maximum dimension of which is less than three micro-millimeters, and which is capable of forming a complex with titanium hydrate wherein the titanium compound is adsorbed by the barium sulphate particles to such an extent that the average maximum dimensions of the ultimate complex particles are less than four and one-half micro-millimeters.

6. A barium sulphate characterized by having amorphous, highly porous particles the average maximum dimensions of which is less than three micro-millimeters, and which is capable of forming a complex with titanium hydrate wherein the titanium compound is adsorbed by the barium sulphate particles to such an extent that the average maximum dimensions of the ultimate complex particles approximate four micro-millimeters.

7. A barium sulphate characterized by having amorphous, highly porous particles the average maximum dimension of which is less than three micro-millimeters, said product being capable of adsorbing highly dispersed colloidal substances to an unusual degree with substantially no increase in the dimension of the ultimate particles of the complexes so formed over those of the original ultimate particles of barium sulphate.

8. A barium sulphate characterized by having amorphous, highly porous particles the average maximum dimension of which is less than three micro-millimeters and containing a fraction of a per cent of sodium sulphate in permanent combination therewith.

9. The hereindescribed barium sulphate product having ultimate particles of an average diameter of less than three micro-millimeters which particles are capable of adsorbing highly dispersed colloidal particles to form a complex whose ultimate particles have an average diameter of less than 100% more than that of the barium sulphate ultimate particles and containing a fraction of a per cent of sodium sulphate in permanent combination therewith.

Signed at Charleston, in the county of Kanawha and State of West Virginia, this 15th day of May, 1922.

JAMES B. PIERCE, Jr.